(12) United States Patent
Overby

(10) Patent No.: US 9,509,824 B2
(45) Date of Patent: *Nov. 29, 2016

(54) MULTI-PHONE PROGRAMMING APPLICATION

(71) Applicant: Brightpoint, Inc., Plainfield, IN (US)

(72) Inventor: Terry A. Overby, Garland, TX (US)

(73) Assignee: Brightpoint, Inc., Indianapolis, IN (US)

( * ) Notice: Subject to any disclaimer, the term of this patent is extended or adjusted under 35 U.S.C. 154(b) by 684 days.

This patent is subject to a terminal disclaimer.

(21) Appl. No.: 13/864,061

(22) Filed: Apr. 16, 2013

(65) Prior Publication Data

US 2014/0309957 A1    Oct. 16, 2014

Related U.S. Application Data

(63) Continuation of application No. 11/464,126, filed on Aug. 11, 2006, now Pat. No. 8,423,007, which is a continuation-in-part of application No. 10/708,726, filed on Mar. 19, 2004, now Pat. No. 7,110,751.

(51) Int. Cl.
*G01N 37/00* (2006.01)
*H04M 1/725* (2006.01)
*G06F 9/445* (2006.01)

(52) U.S. Cl.
CPC ............ *H04M 1/72525* (2013.01); *G06F 8/61* (2013.01)

(58) Field of Classification Search
CPC ................... H04M 1/72525; H04M 1/72505; H04M 3/42178; G06F 9/4411
USPC ....................... 455/418, 419, 433; 702/81, 82
See application file for complete search history.

(56) References Cited

U.S. PATENT DOCUMENTS

| | | |
|---|---|---|
| 5,155,860 A | 10/1992 | McClure |
| 5,249,218 A | 9/1993 | Sainton |
| 5,297,191 A | 3/1994 | Gerszberg |
| 5,414,751 A | 5/1995 | Yamada |
| 5,418,837 A | 5/1995 | Johansson et al. |
| 5,491,740 A | 2/1996 | Ellis et al. |
| 5,603,084 A | 2/1997 | Henry, Jr. et al. |
| 5,754,954 A | 5/1998 | Cannon et al. |
| 5,887,253 A | 3/1999 | Oneil et al. |
| 5,926,756 A | 7/1999 | Piosenka et al. |
| 5,930,703 A | 7/1999 | Cairns |

(Continued)

FOREIGN PATENT DOCUMENTS

| | | |
|---|---|---|
| JP | 2002-247226 | 8/2002 |
| TW | 443062 | 6/2001 |

OTHER PUBLICATIONS

Office Action for Taiwanese Patent Application No. 096129805 dated Nov. 25, 2013, with English translation.

*Primary Examiner* — An Do
(74) *Attorney, Agent, or Firm* — Ice Miller LLP

(57) ABSTRACT

Automated provisioning of radiotelephone handsets at a fulfillment center and automated quality assurance uses a computer database of specifications for authentication and activation from multiple handset manufacturing vendors, radiotelephone service providers, and distributors. A universal interface system is provided to efficiently access diverse makes and models of handsets. The handsets are attached to the interface system in accordance with a build request, checked to see if the attached handset matches the build request, and automatically provisioned via the interface in accordance with the build request.

20 Claims, 21 Drawing Sheets

(56) References Cited

U.S. PATENT DOCUMENTS

| | | | |
|---|---|---|---|
| 5,974,311 A | 10/1999 | Lipsit | |
| 6,018,656 A * | 1/2000 | Shirai | H04W 8/265 |
| | | | 455/418 |
| 6,029,143 A | 2/2000 | Mosher et al. | |
| 6,092,133 A | 7/2000 | Erola et al. | |
| 6,223,028 B1 | 4/2001 | Chang et al. | |
| 6,393,408 B1 | 5/2002 | Mosher et al. | |
| 6,487,403 B2 | 11/2002 | Carroll | |
| 6,496,692 B1 * | 12/2002 | Shanahan | H04M 1/72527 |
| | | | 455/413 |
| 6,997,379 B2 | 2/2006 | Boyce et al. | |
| 7,110,751 B1 * | 9/2006 | Overby | H04M 1/72525 |
| | | | 455/418 |
| 2003/0008636 A1 | 1/2003 | McGregor et al. | |
| 2003/0022655 A1 | 1/2003 | Bogat | |
| 2003/0027581 A1 | 2/2003 | Jokinen et al. | |
| 2003/0162533 A1 | 8/2003 | Moles et al. | |
| 2004/0005910 A1 | 1/2004 | Tom | |
| 2004/0102217 A1 | 5/2004 | Kacines | |
| 2004/0116109 A1 | 6/2004 | Gibbs et al. | |
| 2004/0176133 A1 | 9/2004 | Lipsit | |
| 2005/0032511 A1 | 2/2005 | Malone et al. | |
| 2005/0045717 A1 | 3/2005 | Rager et al. | |
| 2005/0149757 A1 | 7/2005 | Corbett et al. | |
| 2005/0183081 A1 | 8/2005 | Burdy et al. | |
| 2005/0192816 A1 | 9/2005 | Wechsel | |
| 2006/0003755 A1 | 1/2006 | Kuo | |
| 2006/0015864 A1 | 1/2006 | Kang | |
| 2006/0052094 A1 | 3/2006 | Kawabe et al. | |
| 2006/0154646 A1 | 7/2006 | Tung | |
| 2006/0293081 A1 | 12/2006 | Overby | |
| 2006/0293774 A1 | 12/2006 | Drader et al. | |
| 2007/0105538 A1 | 5/2007 | Hassan et al. | |
| 2007/0106985 A1 | 5/2007 | Pan et al. | |

\* cited by examiner

Administrator Setup Tables

Phone Setup Table ⟋ 70
- Manufacturing Vendor Name
- Phone Model/Name/Number
- Phone Technology
- Software Version

Item Number Setup Table ⟋ 74
- Item Number
- Customer Name
- Vendor Name
- Model Name/Number
- Phone Graphic
- BREW Ready
- MIN
- MDN
- SCM
- Vcoder
- Browser IP

Customer Setup Table ⟋ 72
- Customer Name
- Customer Address
- Book Number

User Setup Table ⟋ 76
- User Name
- User Role
  - Administrator
  - Manager
  - Operator

*FIG. 2*

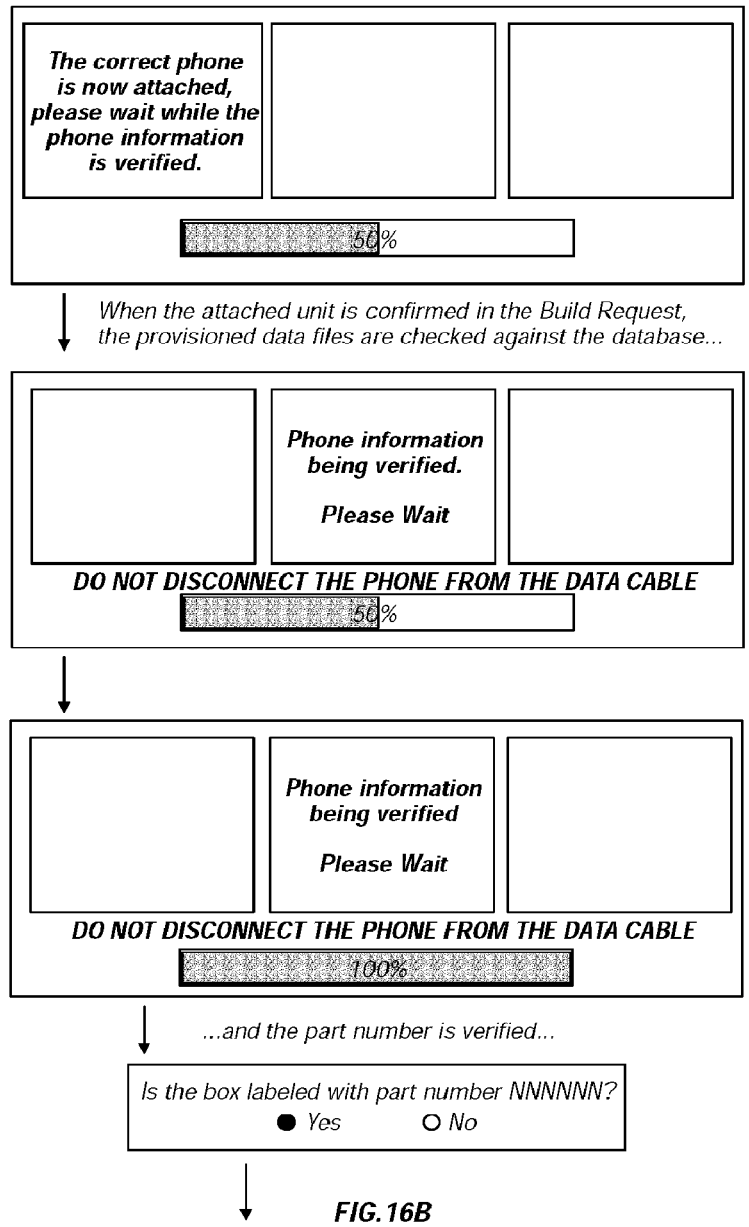

MULTI-PHONE PROGRAMMING APPLICATION

CROSS REFERENCE TO RELATED APPLICATION

This U.S. Utility patent application is a continuation application of, and claims priority to, co-pending U.S. patent application Ser. No. 11/464,126, filed Aug. 11, 2006, which is a continuation-in-part application of, and claims priority to, U.S. patent application Ser. No. 10/708,726 (now U.S. Pat. No. 7,110,751), filed on Mar. 19, 2004, the contents of each of which are hereby incorporated by reference in their entirety into this disclosure.

BACKGROUND

This invention relates generally to automating the production provisioning process for distribution of wireless radiotelephone handsets, and particularly to a system to production provision handsets to meet customer specifications for handsets and communication services. The systems especially limit the need for human interfacing in the process and provide automated quality assurance to control product quality.

Rapid growth has characterized various telecommunication industries, most especially the mobile telephone industry. Because of this rapid growth, there are now many different manufacturers of the radiotelephone handsets used in the mobile phone industry. In addition to the multiple manufacturers, there are also multiple service providers or carriers. To further complicate matters, each carrier can use a different and incompatible mobile phone technology to power its network. Today, there are approximately 10 radiotelephone handset manufacturers, at least 4 major service providers or networks and more than 100 smaller networks, and at least 4 different technologies for mobile phones. This makes it especially complicated to properly provision phones in the production thereof with all of the necessary information required by either the radiotelephone handset seller or the service provider.

Manufacturing technology steadily expands the numbers of handset models and arrays of selectable handset features. Similarly, telecommunication service providers adapt features of broadcast systems and business practices to accommodate available hardware features, including differentiating services based on geographic and temporal factors. The services must address both legacy hardware and newly emerging hardware. Further, distributors of handset packages and service agreements order a wide diversity of handsets and service options to sell, based on marketing needs.

Radiotelephone handsets are typically provisioned at different stages in manufacture, distribution, and use to install data for phone operation with diverse service network functions. A provisioning process is, in part, a sequence of operations for encoding reference data and program routines into radiotelephone handsets (hardware). This enables and authorizes the handsets to communicate via one or more telecommunication systems (services), and makes available handset features for the user to access service features. Provisioning typically requires different processes specific to many different hardware types and service systems, and each provisioning process is typically done piecemeal. Therefore, the work of provisioning is complex and demanding of key resources, especially of human direction and input. Provisioning steps typically occur in vendor factories, in service centers, and at distributor outlets, culminating in some tasks required of the user, i.e. the ultimate customer.

Accordingly, methods and systems are highly valued that can improve provisioning efficiencies while accommodating ongoing changes in the process. U.S. Pat. No. 5,603,084 to Henry, U.S. Pat. No. 6,223,028 to Chang, U.S. Pat. No. 5,297,191 to Gerszberg, and U.S. Pat. No. 5,754,954 to Cannon each teach systems for remote, one-on-one programming of radiophones, for use at point-of-sale by a retailer or post-sale by an end-user.

U.S. Pat. No. 5,491,740 to Ellis provides a mechanical device programmed to physically enter key strokes into handsets for selecting phone and carrier features.

U.S. Pat. No. 5,926,756 to Piosenka, U.S. Pat. No. 5,974,311 to Lipsit, and U.S. Pat. No. 6,487,403 to Carroll each provide computer-controlled, one-on-one programming of telecommunication devices for network operation at their points-of-sale.

U.S. Pat. Nos. 6,029,143 and 6,393,408 to Mosher and U.S. Pat. No. 5,887,253 to O'Neil teach systems to inventory and distribute pre-packaged and/or preprogrammed phone sets for various manufacturing vendors and cellular service providers. Additionally, the Mosher patents disclose the possibility of a programming step as part of the inventory and distribution system.

The art recognizes two distinctly different types of provisioning: production provisioning and service provisioning. A raw unit from the equipment manufacturer usually does not have any of the basic network settings loaded that are necessary to communicate with the particular network. Production provisioning is the process of loading settings that include at least the basic settings into a raw unit from the equipment manufacturer. Service provisioning encompasses the setup of a given device, previously production provisioned, for use in a network. For service provisioning, the unit already contains basic settings that allow basic communication within the network prior to service provisioning. Without first completing production provisioning, a unit cannot receive service provisioning data from the network service, for example in over-the-air programming and activation (OTAPA), due to the unit not having the basic settings necessary for network communication.

The equipment manufacturer builds a unit to various specifications. The configuration generally depends on who is buying the handset. A major service provider typically purchases handsets directly from a manufacturer pre-loaded with the network settings. In this case, the handset will work on the cellular network without any further programming required. These units may be packaged in the network's marketing package, and distributed with the network's literature and other ancillary items that may be deemed required by the service provider. Some of these ancillary items may include a welcome guide, a network branded communication device, and adapter for charging a battery in a motor vehicle, a large battery, or any other items that the network may desire in the retail package.

Smaller service providers do not usually have the buying power of larger networks to deal directly with the manufacturer for new wireless devices. These smaller networks may buy their units from distribution centers that may in turn purchase units directly from the manufacturer with manufacturer default settings. The units procured by the distribution center are considered to be 'generic.' A generic unit does not contain any or enough of the settings that are required for basic communication within a network, and will not be capable of receiving OTAP service provisioning. These wireless devices will not work on any network, no matter what the size of the network, without first completing the production provisioning process and being programmed with the basic network settings.

Distribution centers may buy large quantities of wireless devices from the manufacturer with default settings. The distributors then program a number of these generic wireless devices for a specific cellular network. Only then are these wireless devices capable of being used on that specific cellular network.

As mentioned, production provisioning is the process of loading the required settings into a generic unit for use in a specific network environment. These settings are determined by the network. The settings are then used to create specific software packages for the unit. These software packages are then loaded into the generic unit, making the unit ready for use in the network. If desired, production-provisioned units are capable of receiving network service provisioning as may be required by the network, however, in general smaller networks do not use OTAPA so it would be advantageous to load all or at least most of the settings desired by the network service provider at the same time as the basic settings are loaded, i.e. during the production provisioning process.

Each cellular network has its own unique set of network parameters. The settings of one network will not work on another network because the settings are not compatible with any other network. Even seemingly simple processes like OTAPA require the handset to first have the minimum cellular network settings, for the given cellular network, pre-loaded into the handset. Generic devices cannot be provisioned via OTAPA.

Wireless devices, once programmed and activated, have the ability to utilize many of the cellular networks around the country. This is accomplished with a predefined roaming file (Preferred Roaming List or PRL) that is developed based upon agreements between the local cellular network and other cellular networks. The roaming list is a unique set of instructions for each cellular network, and must be programmed into the handset as one of the initial network programming parameters.

Below Table A lists some typical hypothetical settings that are required to be in a handset for the handset to fully communicate with any cellular network, especially the NAM settings and the PRL settings. Without these settings, the handset will only be able to place calls to 911. The handset can neither receive OTAPA programming, nor be activated remotely.

TABLE A

Examples of Basic Settings in Wireless Devices

| Section | Settings | | | |
|---|---|---|---|---|
| | Generic | Network A (Large) | Network B (Small) | Network C (Small) |
| Number Assignment Module (NAM) | | | | |
| MIN | ESN Based | ESN Based | XXX0000000 | XXX0000000 |
| MDN | ESN Based | ESN Based | XXX0000000 | XXX0000000 |
| SID | XXX72 | XXX04 | XXX22 | XXX25 |
| Preferred Roaming List (PRL) Identification | | | | |
| Version Number | XXX01 | XXXII | XXXI 0 | XXX01 |
| Multimedia Message Service (MMS) | | | | |
| Service Name | MMS | XXA | XXB | XXC |
| Server Name | XXX | XXX | XXX | XXX |
| Max Message Size | 0 | X58400 | X00000 | X58400 |
| National Agent | None | 1 | 1 | N/A |
| HTTP Header | XXX_MDN: | XXX_MDN: | XXX_MDN: | XXX_MDN: |
| Browser | | | | |
| Proxy Name | None | XXX | YYY | ZZZ |
| Service Type | WAP | HTTP | WAP | HTTP |
| Port | 0 | 8080 | 8080 | 9401 |
| Gateway Address | 0.0.0.0 | None | XXX.99.231.135 | XXX.168.116.61 |
| Proxy authentication | HTTP basic | None | HTTP basic | None |
| Home Page URL | None | http://homepageX | http://homepageY | http://homepageZ |
| Binary Runtime Environment for Wireless (BREW) | | | | |
| ADS Type | Commercial | Commercial | Commercial | Commercial |
| Carrier ID | 0 | ID1 | ID2 | ID3 |
| DNS IP Primary address | 0.0.0.0 | 66.174.3.XXX | 65.162.110.XXX | 66.60.13XXX |
| ADS Commercial Server URL | None | serverXXX.com | serverXXX.com | serverXXX.com |
| ADS Test Server | None | serverXXX.com | serverXXX.com | none |

There remains in the field a need for an improved system to production provision radiophone handsets with data and programs for activation and operation. The improved system would desirably provide more automation and less human interaction while still maintaining the ability to production provision handsets made by a variety of manufacturers for use by many different service providers.

SUMMARY OF THE INVENTION

In this text the terms phone, radiophone, and radiotelephone are used interchangeably. "Handset unit" is synonymous with these terms. The invention provides a system for production provisioning radiotelephone handsets in which one preferred embodiment is a software application comprising methods and apparatus for production provisioning radiotelephone handsets.

The invention production provisions multiple radiotelephone handset types with minimal user interaction, gathering and loading information into the radiotelephone handsets automatically. The multi-phone production provisioning application is typically networked, so that administrative and management users can load shared application information with customer and handset specifications at either a remote computer terminal or the local computer controlled provisioning interface. Once the necessary data are entered by an administrator or manager, the invention then allows an operator to automatically production provision multiple radiotelephone handsets with minimal user interaction. As a separate optional embodiment, the invention has built in quality control verification software instructions that can automatically verify and monitor the production provisioned radiotelephone handsets for meeting specifications.

One embodiment of the invention provides a universal production provisioning system for radiotelephone handset units of varying model, manufacturer, and technologies. The system includes an interface having at least one universal connector adapted for connection to radiotelephone handsets having different specifications. A computer is operably connected to the interface, and memory storage in communication with the computer contains production provisioning and instruction data for a specified radiotelephone handset connected via the interface. The system includes software for verifying connection of the specified handset and automatically transferring the production provisioning data to handset memory storage via the interface in accordance with instruction data.

The universal connector to the handset can be a male USB Type A connector, male USB Type B connector, male Mini USB connector, male Mini USB 2.0 connector, male 4-pin IEEE-1394 connector, male 6-pin IEEE-1394 connector, female USB Type A connector, female USB Type B connector, female Mini USB connector, female Mini USB 2.0 connector, female 4-pin IEEE-1394 connector, female 6-pin IEEE-1394 connector, and the like, and combinations thereof.

The universal production provisioning system can be operably connected to the computer via metallic wire, radiofrequency communication, infrared communication, fiber optic cable, and the like, and combinations thereof.

The memory storage can be random access memory, non-volatile hard drive storage, non-volatile flash memory, volatile flash memory, removable magnetic media storage, optical storage, magnetic tape storage media, EPROM, and the like, and combinations thereof.

The production provisioning data can include number assignment module settings, browser settings, message settings, and the like, and combinations thereof.

The production provisioning data can also include roaming instructions, user features, short messaging service settings, phone book entries, date book entries, carrier specific settings, user specific settings, and the like, and combinations thereof.

The instruction data can include production build request number, quantity of phones to provision, carrier type, customer identification data, starting part number, final part number, handset manufacturer, handset technology type, handset model number, and the like, and combinations thereof.

In one embodiment, the production provisioning data can include Number Assignment Module data, Preferred Roaming List Identification data, Multimedia Message Service data, browser data, or Binary Runtime Environment for Wireless data.

In one embodiment, the production provisioning data can include at least the Number Assignment Module Mobile Identification Number, Number Assignment Module System Identifier, and Preferred Roaming List Identification Version Number, and can optionally include additional settings.

Another embodiment of the invention includes software that provides instructions for: (a) generating a build request comprising the radiotelephone handset specification and production provisioning and instruction data for the specified handset; (b) storing the build request in the memory storage; (c) retrieving data from the build request; (d) generating instructions to connect the provisioning system to a handset in accordance with the build request specification; and (e) generating instructions to disconnect the provisioned handset from the provisioning system.

The universal production provisioning system can include additional workstations operably connected via metallic wire, radiofrequency communication, infrared communication, fiber optic cable, and the like, and combinations thereof.

The production provisioning data can include service provider codes, authentication keys, and the like, and combinations thereof The data retrieval can include: (a) selecting a production build request number; (b) displaying the final part number; (c) displaying the handset manufacturer; (d) displaying the handset manufacturer's model number; (e) displaying an image of the handset model; (f) displaying the customer name; and the like, and combinations thereof.

The software can include instructions to inspect the memory storage of the handset and verify provisioning data integrity, and instructions to store data gathered from the verification and generate reports based on the verification data.

The inspection software can include the steps of: (a) entering a production build request number via a third workstation; (b) connecting to the third workstation a provisioned handset selected from the plurality of provisioned handsets according to the build request data associated with the production build request number; (c) comparing the provisioning information in the memory storage of the provisioned handset to the provisioning data associated with the production build request number; (d) marking the handset with a passing indicator if the provisioning information matches the provisioning data; (e) marking the handset with a failed indicator if the provisioning information differs from the provisioning data; (f) repeating the connection, comparison, and marking on additional handsets for the production build request number; (g) determining whether the production build request passes or fails based on the instruction data associated with the production build request number and returning a pass/fail for the production build request; (h) sending failed handsets from a passing production build request to a repair station; (i) sending handsets from a failing production build request to an area for segregation; or the like, and combinations thereof.

The third workstation can have access to a database comprising ANSI Quality tables for inspection under ANSI Z 1.4 to determine whether the production build request passes or fails.

The software can include instructions for generating, storing in memory, and retrieving data from a plurality of the build requests.

The retrieval data from a build request can include software instructions with the steps of: (a) selecting a production build request number; displaying the final part number; (b) displaying the handset manufacturer; (c) displaying the handset manufacturer's model number; (d) displaying an image of the handset model; (e) displaying the customer name; and the like, and combination thereof.

The software instructions for retrieving data from the build request can include the steps of: (a) selecting a production build request number; (b) displaying the final part number; (c) displaying the handset manufacturer; (d) displaying the handset manufacturer's model number; (e) displaying an image of the handset model; (f) displaying the customer name; or the like, and combinations thereof.

The software can also include instructions for querying the connected handset to compare connected handset specification data with the build request specification data. The querying instructions can include the steps of: (a) communicating with the connected handset; (b) determining manufacturer and model number of the handset; (c) comparing the manufacturer and model number of the connected handset with the requested manufacturer and model number; and (d) continuing the provisioning or displaying instructions to the operator to connect a different handset based on the result of the comparison.

The software can include instructions for inspecting the memory storage of the automatically provisioned handset to verify provisioning data integrity, and can also include instructions for storing data gathered from the verification step and generating reports based on the data.

The software inspection instructions can include steps of: (a) entering a production build request number; (b) connecting the provisioned handset according to the build request data associated with the production build request number; (c) comparing the provisioning information in the memory storage of the connected handset to the provisioning data associated with the production build request number; (d) marking the handset with a passing indicator if the provisioning information matches the provisioning data; (e) marking the handset with a failed indicator if the provisioning information differs from the provisioning data; (f) repeating the connection, comparison, and marking for additional handsets for the production build request number; (g) determining whether the production build request passes or fails based on the instruction data associated with the production build request number and returning a pass/fail for the production build request; (h) sending failed handsets from a passing production build request to a repair station; (i) sending handsets from a failing production build request to an area for segregation; or the like, and combinations thereof.

BRIEF DESCRIPTION OF THE DRAWINGS

FIG. 2 shows illustrative administrative database tables used to store various provisioning information for the provisioning system of FIG. 1.

FIGS. 16A, 16B, 16C, and 16D together show a series of menu screens used as part of the Quality Assurance aspect of the Operator Application process to verify the provisioning data is correctly loaded into the radiotelephone handsets using existing information already loaded into the application software of FIG. 6 according to one embodiment of the present invention.

DETAILED DESCRIPTION

Figure 1:
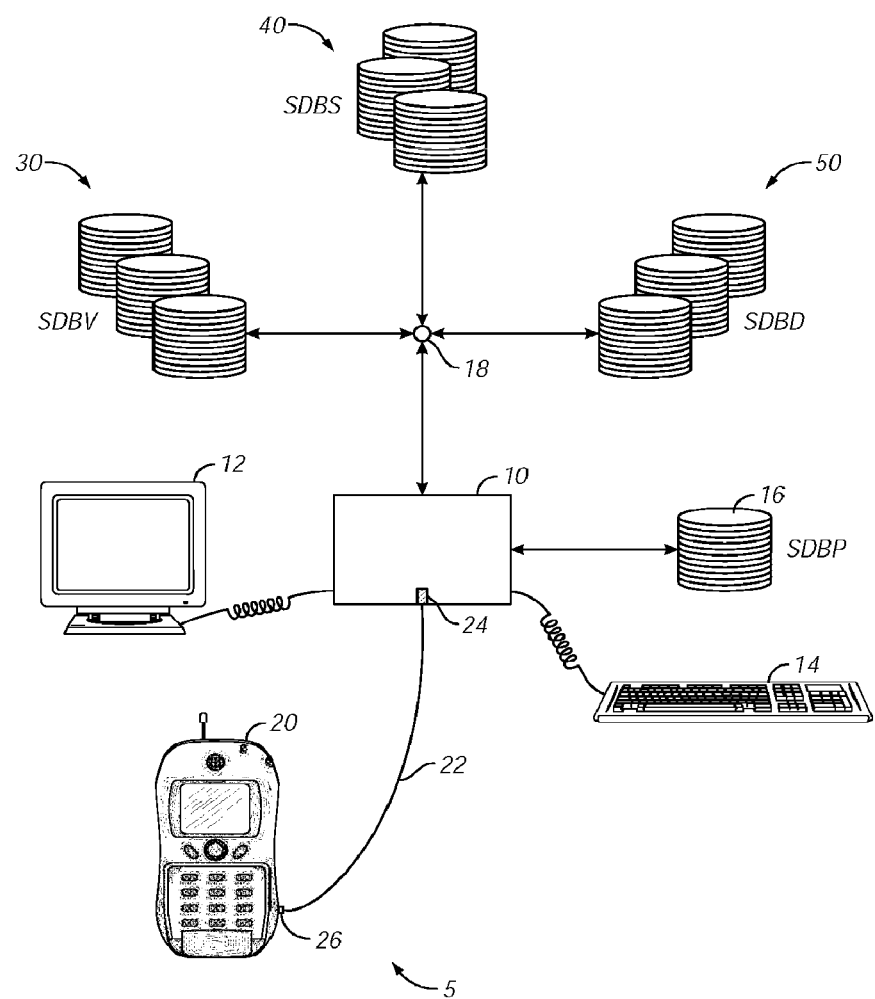
FIG. 1 is a system schematic for provisioning radiotelephone handsets according to one embodiment of the present invention.

In one preferred embodiment shown in FIG. 1, a provisioning system 5 includes a networked, computer-controlled provisioning interface 10 that has a video display interface 12 and user input interface, e.g. a keyboard 14, for interaction with an operator. The provisioning interface 10 includes the provisioning Application Database (SDBA) 16, into which provisioning reference data is imported and formatted for provisioning use. The reference data is obtained via a network 18, for example a local or wide-area network (LAN, WAN) or the internet. The provisioning system 5 downloads the reference data from other storage databases (SDBV) 30, (SDBS) 40, and (SDBD) 50 owned respectively by multiple radiophone vendors, phone service providers, and distributors, who may subscribe to be served by the provisioning system 5.

A radiotelephone handset unit 20 that is to be provisioned is connected to the provisioning interface 10 using a standardized interface connector 22 such as a Universal Serial Bus (USB) interface. The USB interface 22 connects to the provisioning interface 10 using a conventional USB connector 24, and preferably connects to the handset 20 in a similarly standardized connector 26. The USB interface 22 preferably maximizes compatibility between handset outlets 26 and provisioning interface outlets 24.

The invention is enabled for multiple platforms to be compatible with available cellular phone technology, for example including TDMA, CDMA, GSM, 2G, 2.5G, 1RXX, 3G, UMTS. The invention will also be adaptable to other standards as they become available. The provisioning of handsets makes use of existing telecommunication standards, including IS-136, IS683a, IS-707, IS-95, IS-94. Evolving standards will be adopted as they are implemented.

Additionally, the invention contemplates multiple types of universal connectors. The most popular and universal connector known in the art today is the USB connector. Possible connectors currently available in the art include male USB Type A connector, male USB Type B connector, male Mini USB connector, male Mini USB 2.0 connector, male 4-pin IEEE-1394 connector, male 6-pin IEEE-1394 connector, female USB Type A connector, female USB Type B connector, female Mini USB connector, female Mini USB 2.0 connector, female 4-pin IEEE-1394 connector, female 6-pin IEEE-1394 connector and combinations thereof USB refers to the USB-IF supported USB specifications currently available and all future derivations and revisions of the specifications. IEEE-1394 refers to the IEEE foundation's specification number 1394 and all future revisions, derivations, and modifications of this specification.

The invention can use one or more connectors of mixed types. For example, a system could use both a USB and IEEE-1394 connector simultaneously if one handset type required each connector. The important advantage this provides to the invention is the ability to readily adapt to any new connectors as they become standardized and readily available in this art.

The invention can adopt other configurations well known in computer networking technology including a single stand-alone system. For example, the provisioning interface 10 can act as a server to multiple networked work stations equipped as described above for handset provisioning. Alternatively, an installation can employ multiple provisioning interfaces, with or without respective work stations.

The manager setup tables of a preferred embodiment are used by a production manager to compile customer purchase orders termed Build Requests in the provisioning system. The Manager Tables include records listing handset manufacturing vendor names and respective vendor handset technologies; vendor model names and model numbers; customer names (radiotelephone service providers), customer address book numbers, and carrier types; and operator identification and provisioning interface identification. The Manager Setup Tables are compiled by collecting the provisioning data files and program files for the vendors and customers from common access. The invention facilitates the compilation by a user over the network 18 shown in FIG. 1, accessing the subscriber databases SDBV 30, SDBS 40, and SDBD 50.

The Application Collected Tables of a preferred embodiment (not shown) also include data entries for a Quality Assurance (QA) protocol. Quality Assurance is used to maximize provisioning efficiencies and, ultimately, customer satisfaction and convenience. For example, an Electronic Serial Number (ESN) that is programmed into each handset of each Build Request is recorded in three database cells corresponding to initial data entry of the Build Request, an automated scan upon provisioning the handset, and an automated scan of the handset for Quality Assurance. Such comparative data collection permits provisioned radiotelephone handsets to be closely tracked for conformance with Build Request specifications.

The provisioning database 16 uses a foundation comprised of Administrator Setup Tables outlined in FIG. 2. The Administrator Tables include reference data for Phone Setup 70 identifying vendors, phone makes and models, their technologies and operating software; Customer Setup 72 listing customer (service provider) identities and address references; Item Number Setup 74 cataloguing a cross reference that associates a vendor's model of phone with a customer name and provisioning information for storage in the respective phone handsets; and User Setup 76 naming personnel authorized to access the database to enter data into and use the provisioning system. Data entered in the Administrator Tables is accessed through the Manager Tables.

The provisioning steps of a preferred embodiment use programming techniques well known in information technology arts to program the Application Flow Phases for automated execution of provisioning. Any suitable programming technique can be utilized depending on the particular skill of the person implementing the program. The Application Phases store, collect, and transfer provisioning database information to initialize memory modules in various particular phone handsets, using vendor-specific and carrier-specific files and information. The Application Flow Phases comprise these particular phases of program routines: (a) Administrator Setup Phase, which is an information input task listing recognized vendors and customers; (b) Manager Build Setup Phase, which is an information input task defining customer Build Requests; (c) Operator Application Phase, which is an information transfer task to provision handsets for fulfilling customer Build Requests; and (d) Quality Assurance Phase, which is a verification task to check and record whether the Operator Application phase has properly fulfilled Build Requests that were processed.

The Administrator Setup Phase of a preferred embodiment is used to enter or edit data in the Administrator Setup tables. This invention can be used to program any phone for which data is included in the database 16. Therefore, the Phone Setup table 70 of FIG. 2 is populated with data defining each phone model to be provisioned. For each radiotelephone handset service provider who is a customer of a provisioning center using this invention, the Customer Setup table 72 is completed for identifying the respective customers. Customers may designate that their Build Requests can be fulfilled using a plurality of makes and models of radiophone handsets. For each such designation an Item Number Setup table 74 will be completed, giving cross-reference data linking the customer with specific phone models, and specifying appropriate provisioning information for the respective phone model to operate in the customer's service network. The User Setup table 76 identifies in-house personnel at the distribution center who are authorized to use the database 16 for data entry or product provisioning.

Figure 3:
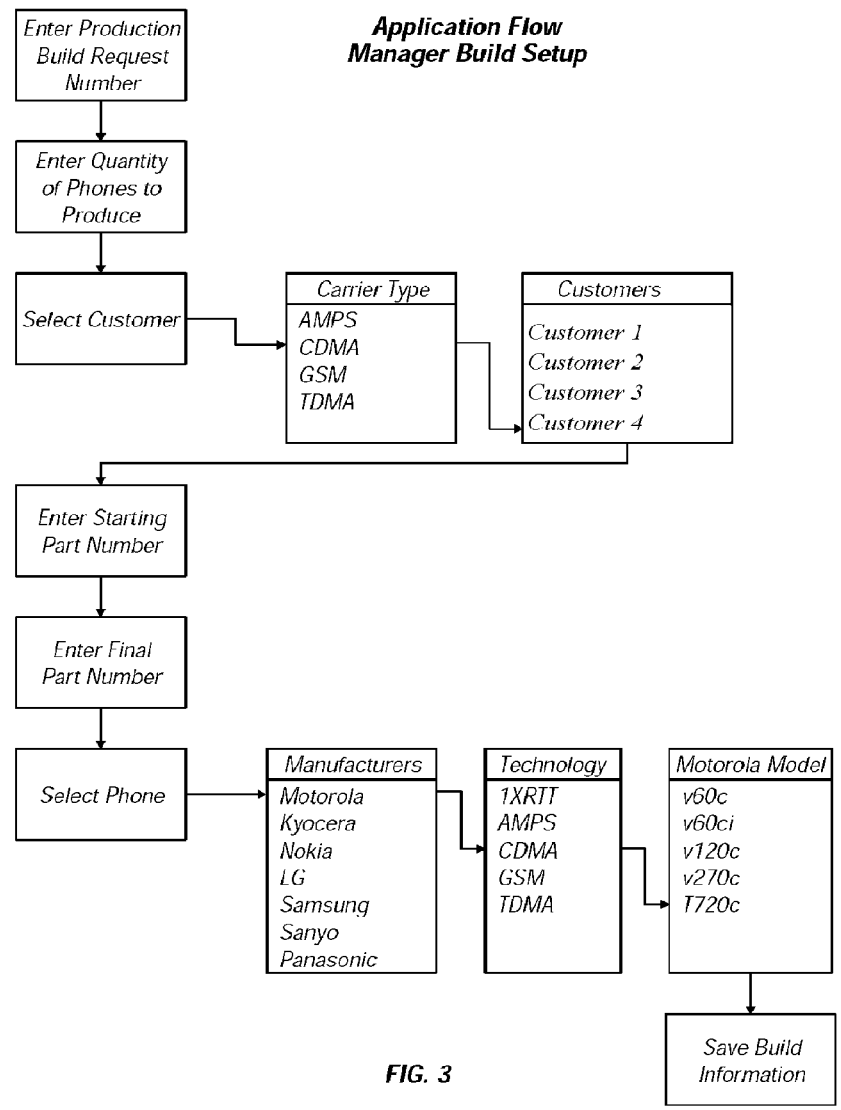
FIG. 3 is a flow diagram for a manager build setup to generate production build requests according to one embodiment of the present invention.

The Manager Build Setup Phase of a preferred embodiment comprises entering data to the Manager Setup Tables of the provisioning database 16 to define a Build Request. The sequence of data input is illustrated in FIG. 3. The Manager Setup Tables automatically pick up data from Administrator Setup Tables corresponding to data identifying customers, vendors, and phone models. The data typically entered by a user for a Build Request includes: production Build Request Number (PBR); quantity of phones to produce; customer selection of carrier type and customer ID; part number range; phone selection of manufacturer, technology, and model; Service Provider Codes, which can be pre-assigned by the manufacturer and/or service provider and/or randomly generated, e.g. Initial and Final Service Provider Code; Authentication Key or Keys, which can be pre-assigned by the manufacturer and/or service provider and/or randomly generated, e.g. Initial and Final Authentication Key.

Figure 4:
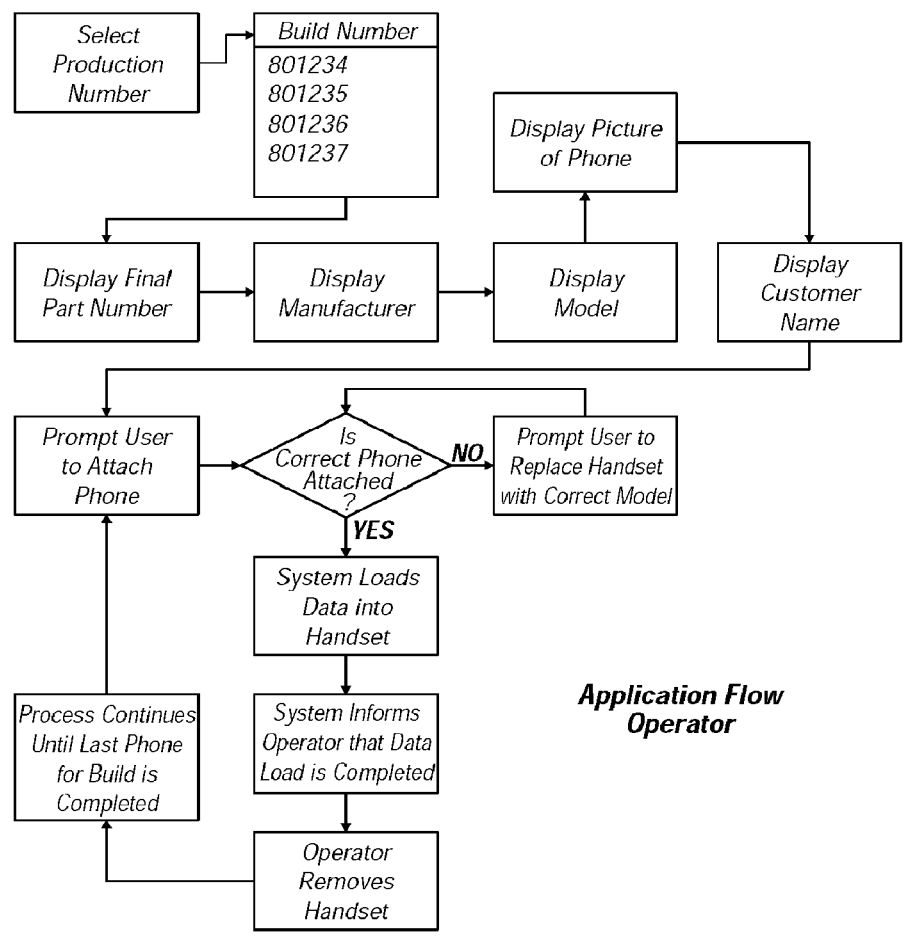
FIG. 4 schematically shows operator interactions with a provisioning interface for provisioning radiotelephone handsets according to one embodiment of the present invention.

The Operator Application Phase of a preferred embodiment comprises interactions between a production assembly operator and the Application Flow program routines through a provisioning interface. FIG. 4 illustrates the flow logic for Operator Application. The operator identifies Build Requests to be processed, and the programs prompt the operator to select, connect/disconnect, and route respective handsets, by referencing the database 16 for specifications appropriate to the particular Build Request numbers. While a phone is connected to the system, the programs collect and download provisioning information to the handsets. The cycle is repeated, and the operator continues the handset selection process in fulfilling a Build Request.

Additionally, the system has the capability to generate, capture and/or use the Service Programming Code (SPC) of each handset. The Service Programming Code is a code that is used to protect the phone from unauthorized programming The SPC can be unique for each individual phone or common to a whole group of phones, depending on service provider preference. The Service Programming Code is also known by many other names in the industry including, but not limited to Master Sublock (MSL), Subsidy Programming Code, Lock Code, and Carrier Lock Code. The handset is usually provided with a default or pre-assigned SPC by the manufacturer, which can be reprogrammed according to the service provider requirements during the provisioning process.

The system also has the ability to generate, capture and/or use the Authentication Key. The Authentication Key (A-Key) is an encryption code used by some radiotelephone handset service providers to ensure that an individual handset is authorized for service on the radiotelephone handset service provider's network. The A-Key can be unique for each individual phone or common to a whole group of phones, depending on service provider preference. The handset is usually provided with a default or pre-assigned A-key by the manufacturer, which can be reprogrammed according to the service provider requirements during the provisioning process.

Figure 5:
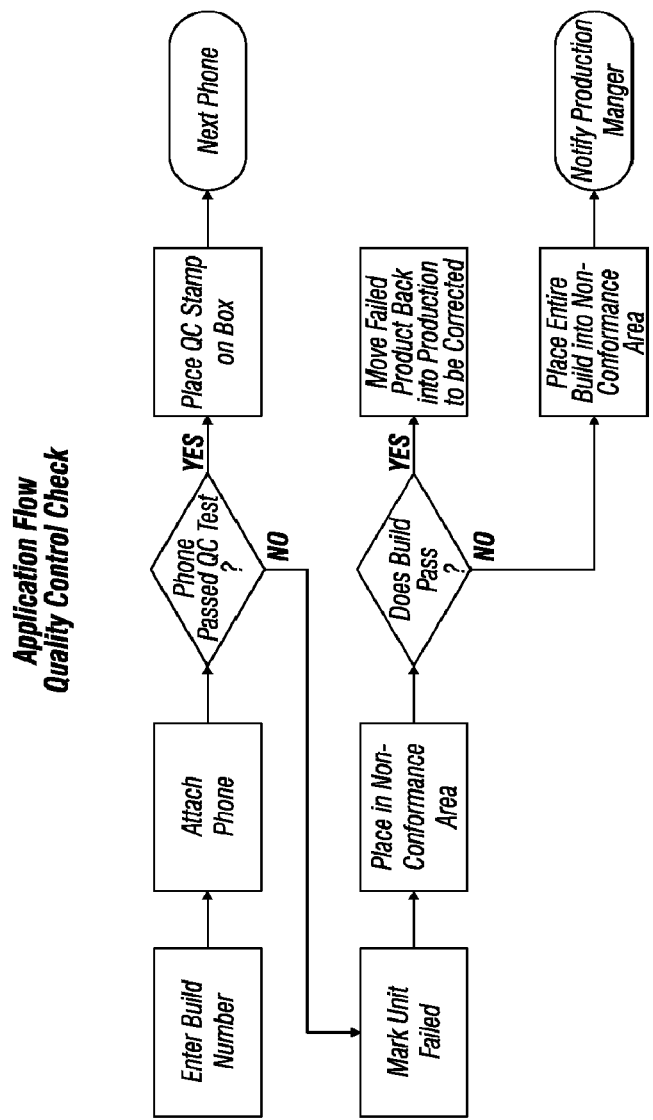
FIG. 5 is a flow scheme for a quality control process for verifying provisioning of radiotelephone handsets according to one embodiment of the present invention.

The Quality Assurance ("QA") Phase of a preferred embodiment entails evaluating the accuracy of fulfillment of the Build Requests, using a work station to check phones processed in the "Operator Application" phase. FIG. 5 illustrates a Quality Control ("QC") Check sequence that implements the QA Phase, which typically flows as follows:

Enter Production Build Request; System instructs which phone to connect; Operator attaches handset; Query phone memory data followed by determination of pass/fail status; if the handset passes, the handset is QC-stamped, packaged, released, and the process repeats itself for the next handset; If the handset fails, the handset is marked as such and diverted to a nonconformance area and the process repeats itself for the next handset; upon all required handsets from a given build request being tested, the system determines whether the build passed or failed; if the build passes, the non-conforming handsets are recycled back into production to be corrected; if the build fails, all handsets, both conforming and non-conforming handsets are placed in a non-conformance area for management action; the QA phase of the preferred embodiment will determine the build pass/fail using ANSI Quality tables for inspection based off ANSI Z 1.4 and includes any future modifications, revisions, or superseding industry standard specifications for inspection.

The QC check in the QA phase of a preferred embodiment uses Application Phase program routines resident in the computer-controlled provisioning system. The QA programs record conformance of the provisioning with Build Request specifications, and also record measurements of completeness of data installation according to specifications in the Manager Setup Tables. The QA protocol maximizes the delivery of compliant products, thereby minimizing costs for re-handling units returned by customers because of defective programming. Handsets can be checked individually or in mass batches corresponding to Build Requests. The provisioning interfaces can serve as both provisioning and QA sites. Thus, complete Build Requests can be processed at a single installation, using any station or a plurality of stations.

Although a preferred embodiment uses the specific steps above to enter, store, and maintain the data required for the system to operate, the key elements of the invention that offer the unique advantages of the current invention are described below.

The invention has no specific data requirements as the data requirements will depend on the given client or enterprise and how it desires to provision the radiotelephone handsets. There is a minimum requirement that the invention have some form of provisioning information. Provisioning information typically comprises provisioning data and instruction data. The provisioning system of this invention can program any radiotelephones for which desired instruction data and provisioning data is available and a compatible universal connector is installed in the provisioning interface.

The preferred embodiments of the invention are primarily suited for phones that cannot be programmed over-the-air because they do not have the enabling settings. Nevertheless, any system that uses some or all of the production provisioning information described herein to automatically provision radiotelephone handsets is within the scope and spirit of the invention.

Instruction data can include information required to provision the phones. This information can include some or all of the following information: production build request number, quantity of phones to provision, carrier type, customer identification data, starting part number, final part number, handset manufacturer, handset technology type, handset model number, and the like, or a combination thereof Provisioning data can include information required to provision the phone with all specific data and settings required for a given radiotelephone handset carrier. This information includes: roaming instructions, user features, number assignment module settings, browser and short messaging service settings, phone book entries, date book entries, message settings, carrier specific settings, user specific settings, default SPC, final SPC, default A-Key, final A-key, and combinations thereof.

Examples of provisioning data can include: the Number Assignment Module (NAM), System Identification Number (SID), Preferred Roaming List (PRL), Multimedia Messaging Service (MMS), browser, and Binary Runtime Environment for Wireless (BREW).

NAM is a storage module in a mobile phone that is used to store the telephone number of the phone and other phone-specific information. It may include the Mobile Identification Number (MIN) and the System Identification Number (SID). MIN refers to the 10-digit unique number that a wireless operator uses to identify the mobile phone. SID is a Global number to identify base stations for TDMA or CDMA networks. These SID codes are 15/16 bit values and can be listed within a Wireless Device to show preference for one network over another.

The Preferred Roaming List, or PRL, is a data file for wireless phones (primarily CDMA and PCS services) which provides a list of alternate networks to use when the service provider's and/or subscriber's primary wireless network cannot be reached. The PRL indicates which bands, sub bands and service provider identifiers should be accepted. Without a PRL, a phone may not be able to roam, i.e. obtain service outside of the home area.

Multimedia Messaging Service, or MMS, is a standard for a telephony messaging systems that allow sending messages that includes multimedia objects (images, audio, video, rich text) and not just text messages as in Short message service (SMS). It is primarily deployed in cellular networks along other messaging systems like SMS, Mobile Instant Messaging and Mobile E-Mail.

A browser is a program that serves as your front end to the Web on the Internet. In order to view a site, you type its address (URL) into the browser's Location field; for example, www.companyXYZ.com, and the home page of that site is downloaded to you.

Binary Runtime Environment for Wireless (BREW) is an application development software platform that can download and run small programs for playing games, sending messages, sharing photos, etc. The BREW runs in between application and the wireless device's chip operating system; thus BREW enables a programmer to develop applications without needing to code for system interface or understand wireless application.

The provisioning data collected for this invention can be obtained from a plurality of information sources including but not limited to handset vendor databases and telecommunication service provider databases. The provisioning information is also consolidated into a plurality of records comprising collected data matched to respective build requests. It is important to note that while one preferred embodiment contemplates the uses of databases for storing and collecting various data, other sources of information suitable for the particular client needs would also be appropriate.

Small carriers do not normally have the ability to perform over-the-air programming for data including MMS, browser, BREW, and the like. In these instances, certain embodiments of this invention can include these features as production provisioning.

While one preferred embodiment comprises the systems embodied in Application Flow Phases detailed above, other possible combinations of the required steps are within the scope and spirit of this invention. The Flow Phases described above organize provisioning data and automate data transfer for high efficiency and accuracy. Another aspect of the inventive systems described above coordinates the provisioning of inventories of diverse radiophone handsets from multiple manufacturing vendors with the required diverse provisioning data from multiple phone service providers. This combination of organization, automation, and coordination improves the business of product delivery for both the vendors and service providers.

Thus, the inventive provisioning system represents an improvement over existing telecommunication hardware programming systems. This invention is highly automated, and it provides the ability to automatically provision handsets to varying customer specifications on a wide variety of radiotelephone handsets by different manufacturers. In addition, the system provides an automated Quality Assurance process to control production and distribution of products with high levels of conformance. Furthermore, the system is not service provider, technology, or connector specific such that it can readily adapt to the ever changing radiotelephone handset market.

EXAMPLES

The following examples depict portions of one possible application used to implement the inventive systems. While this software application is particularly suited for the invention, this is not the only suitable embodiment contemplated by the invention and what is claimed.

Example 1

The following tables depict portions of the Application Database 16. Table 1 illustrates an example of content in an Administrator Setup Table showing the User Setup Table. Table 2 illustrates part of an Item Number Setup Table. Table 3 illustrates part of a Manager Build Request Setup Table. Table 4 illustrates a first portion of an Application Collected Table for the Operator Phase, and Table 5 illustrates a second portion of an Application Collected Table, focusing on data for QA Phase results.

Example 2

Figure 6:
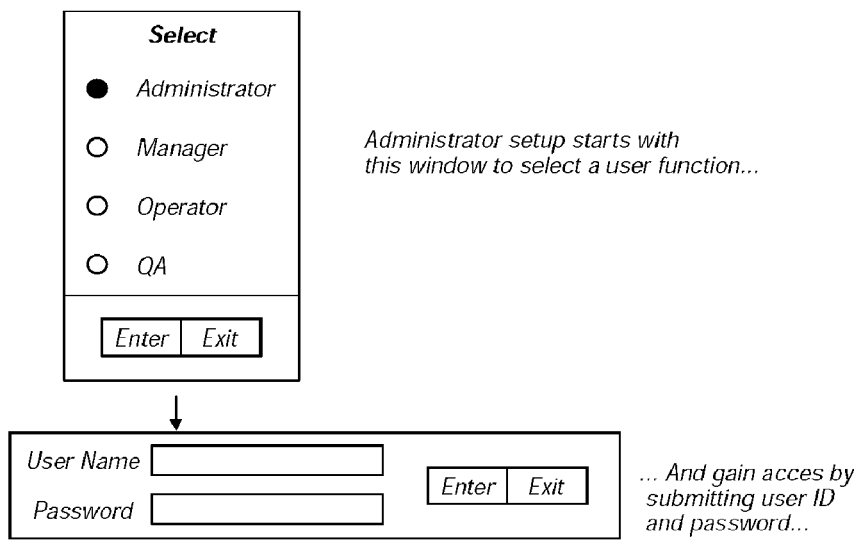
FIG. 6 shows a typical function select and access authorization screen for the application software according to one embodiment of the present invention.

This example illustrates the flow logic for performing Administrator Setup in the application software that automatically guides users through the processes of this invention. As shown in FIG. 6, the first screen encountered is "Start Application Software," which will direct a user into a mode of operation for administrative input, management input, or operator application to either provision radiophone handsets or to perform the QA verification of provisioned products. To start and use the application software, the user must enter a name and password.

Figure 7:
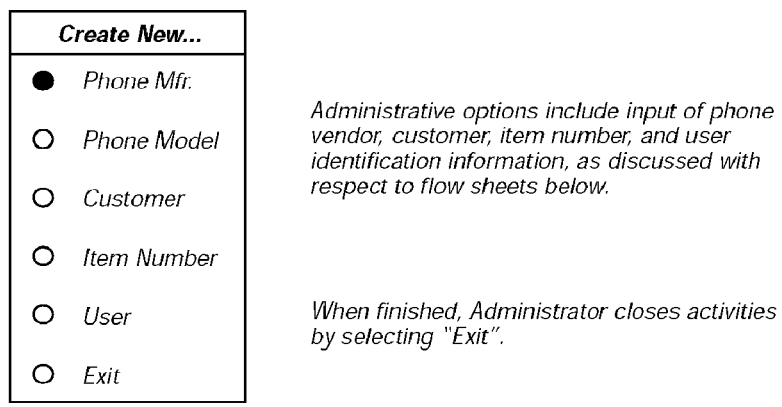
FIG. 7 shows an administrative setup main screen for the application software of FIG. 6 according to one embodiment of the present invention.
Figure 8:
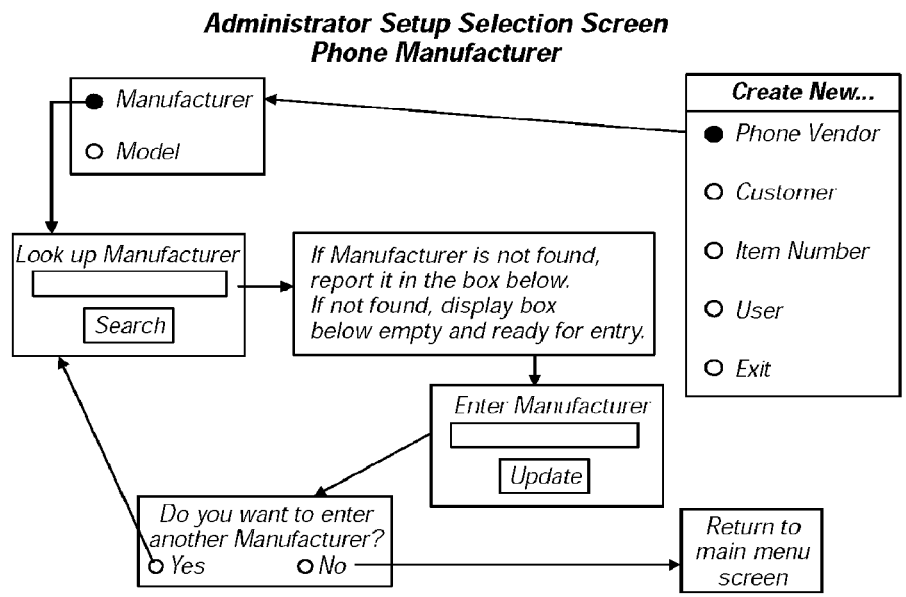
FIG. 8 shows a series of menu screens used as part of the Administrator Setup process for entering radiotelephone handset manufacturer information into the application software of FIG. 6 according to one embodiment of the present invention.
Figure 9:
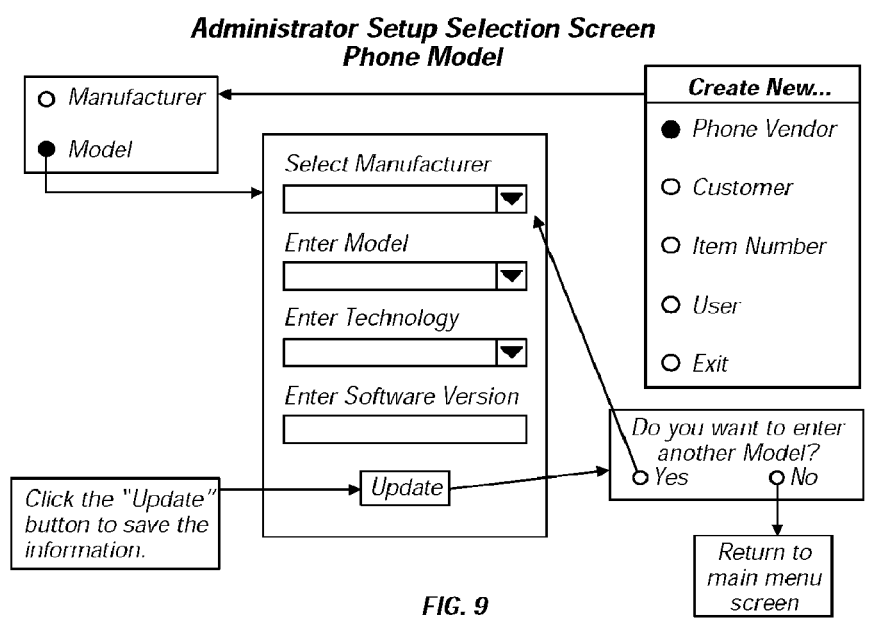
FIG. 9 shows a series of menu screens used as part of the Administrator Setup process for entering radiotelephone handset model information into the application software of FIG. 6 according to one embodiment of the present invention.
Figure 10:
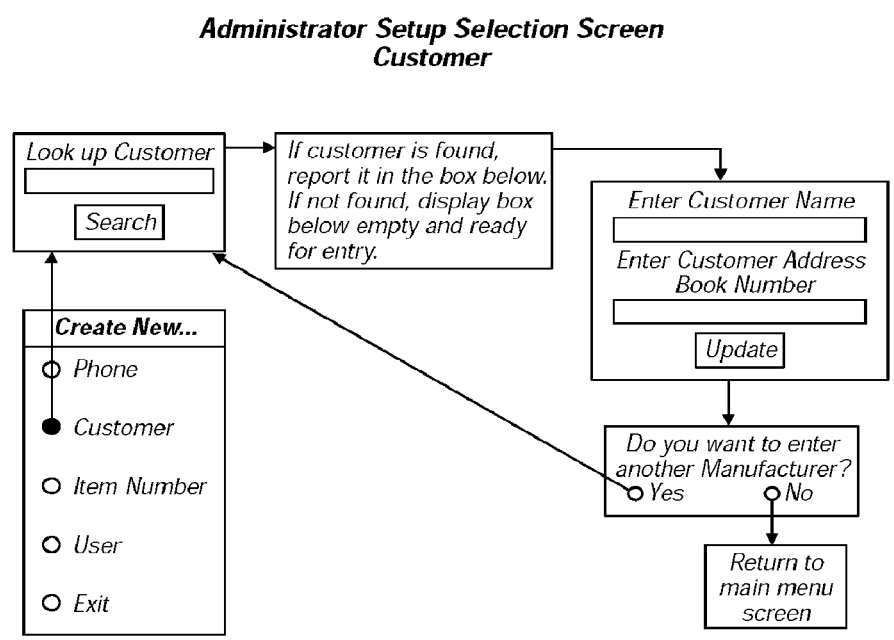
FIG. 10 shows a series of menu screens used as part of the Administrator Setup process for entering customer (service provider) information into the application software of FIG. 6 according to one embodiment of the present invention.
Figure 11:
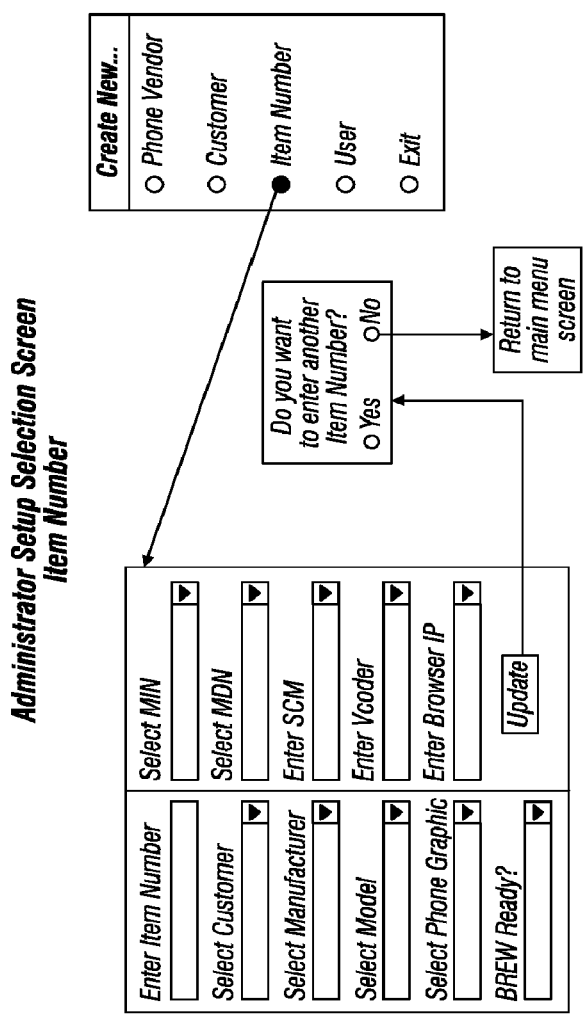
FIG. 11 shows a series of menu screens used as part of the Administrator Setup process for entering item number information into the application software of FIG. 6 according to one embodiment of the present invention.
Figure 12:
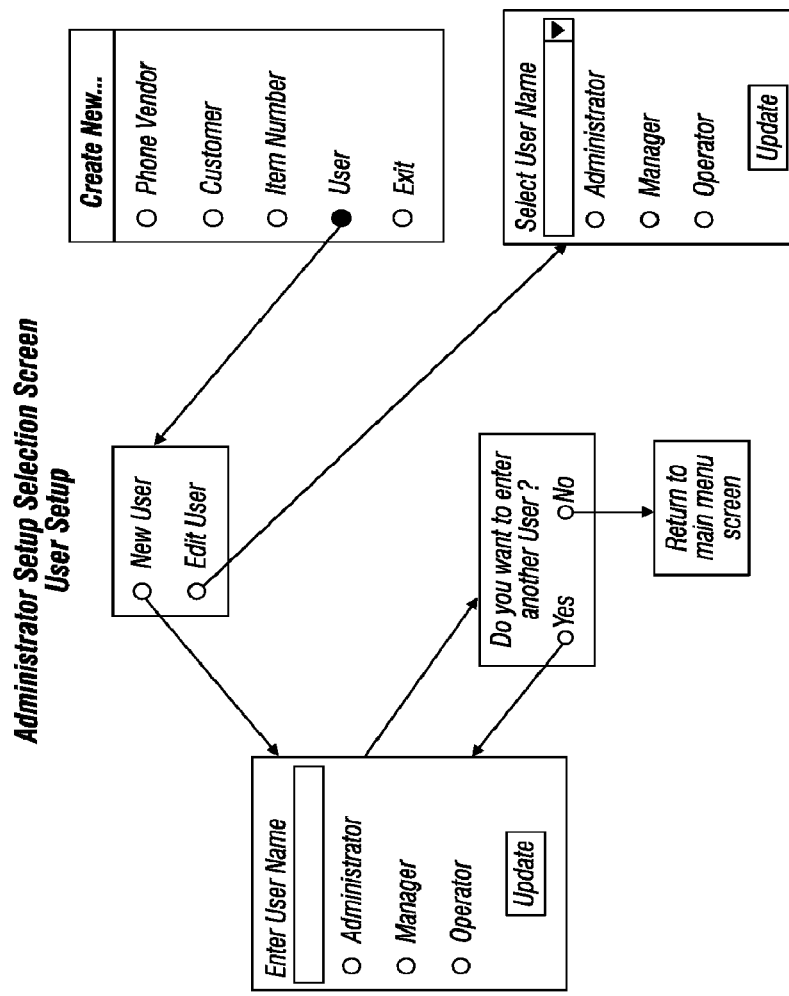
FIG. 12 shows a series of menu screens used as part of the Administrator Setup process for entering user information into the application software of FIG. 6 according to one embodiment of the present invention.

In FIG. 6, "Administrator" is selected. To enter the manager and operator functions discussed below, the user would make another appropriate selection in this screen. In FIG. 7 the Administrator Setup Main Screen offers choices of working in Administrator Setup Tables to define these data: Phone Manufacturer, Phone Model, Customer, Item Number, and User Setup. FIGS. 8-12 depict the respective Administrator Setup data entry screens.

Example 3

Figure 13A:
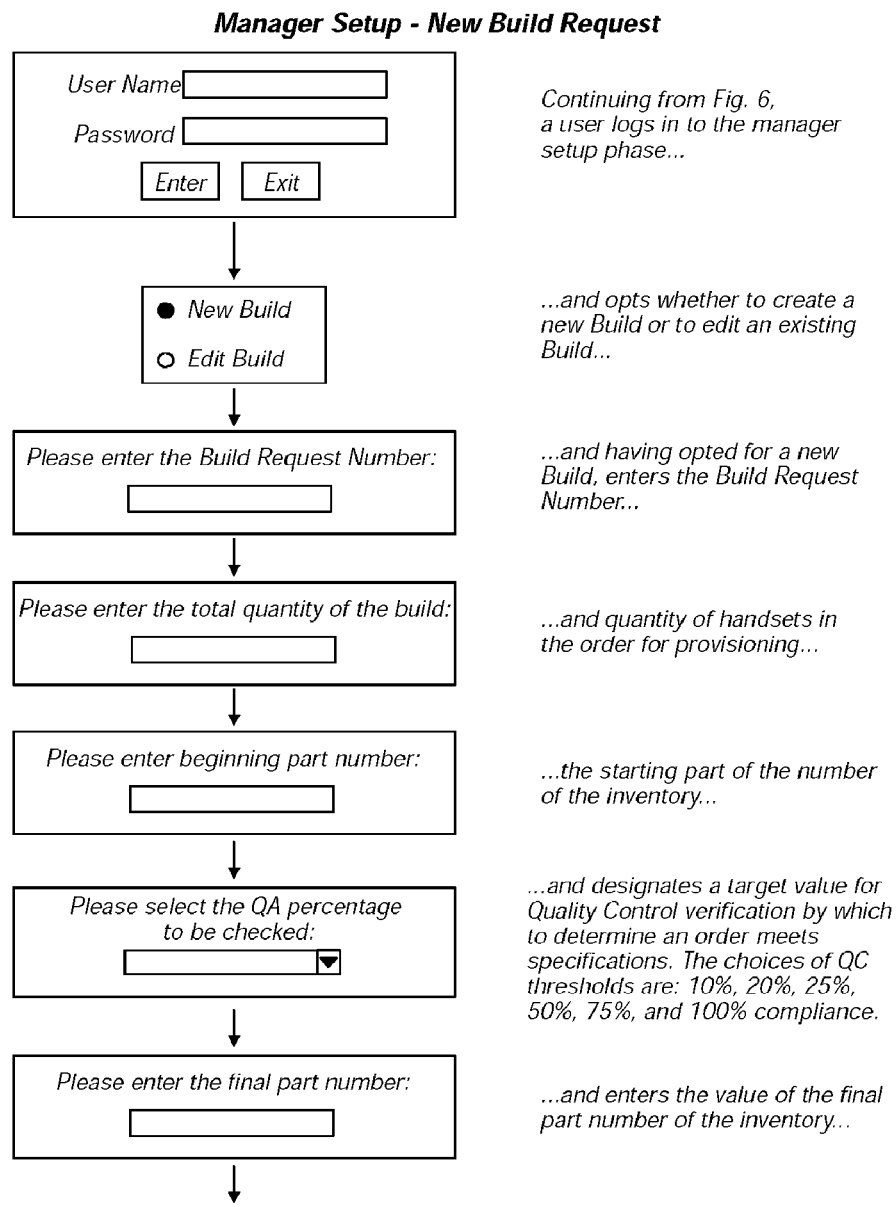
FIGS. 13A and 13B together show a series of menu screens used as part of the Manager Setup process to generate a new Build Request in the application software of FIG. 6 according to one embodiment of the present invention.
Figure 13B:
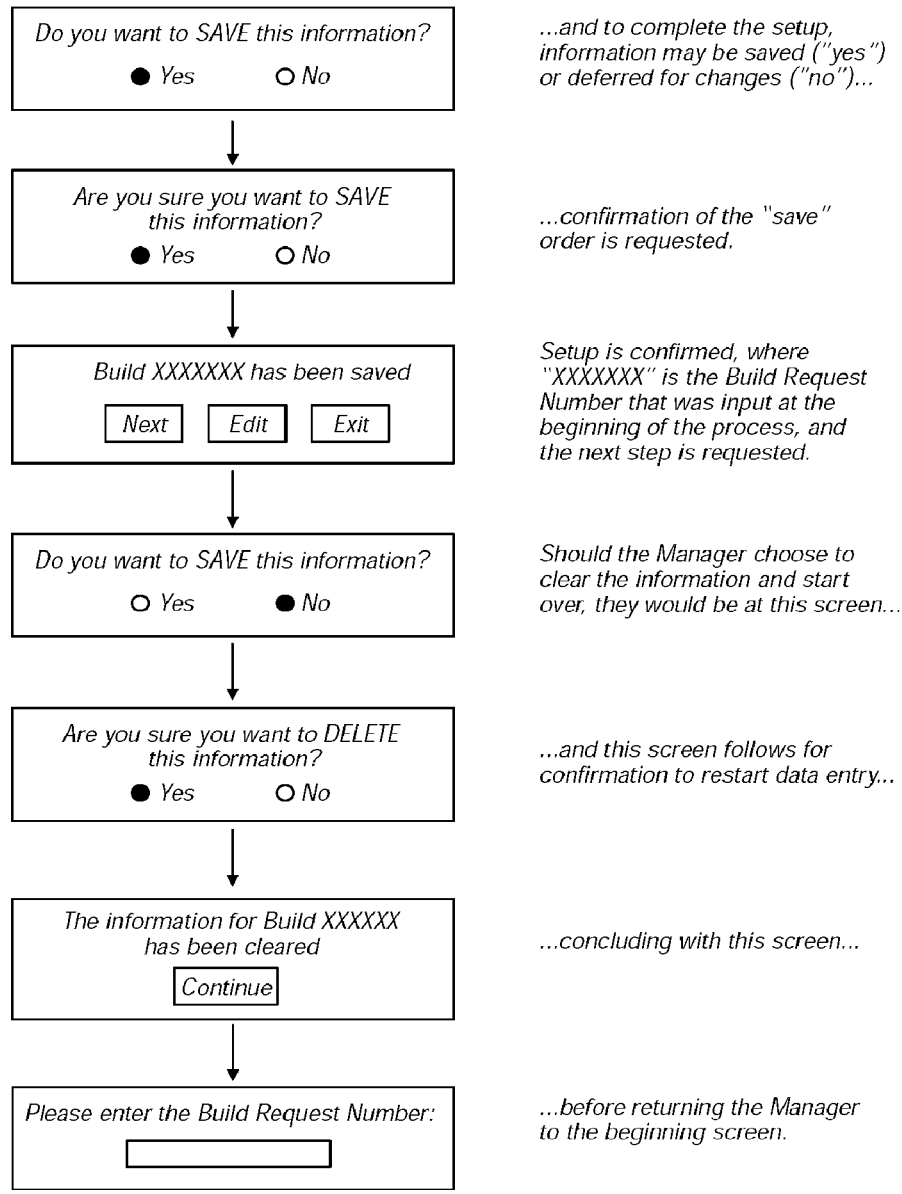
Figure 14A:
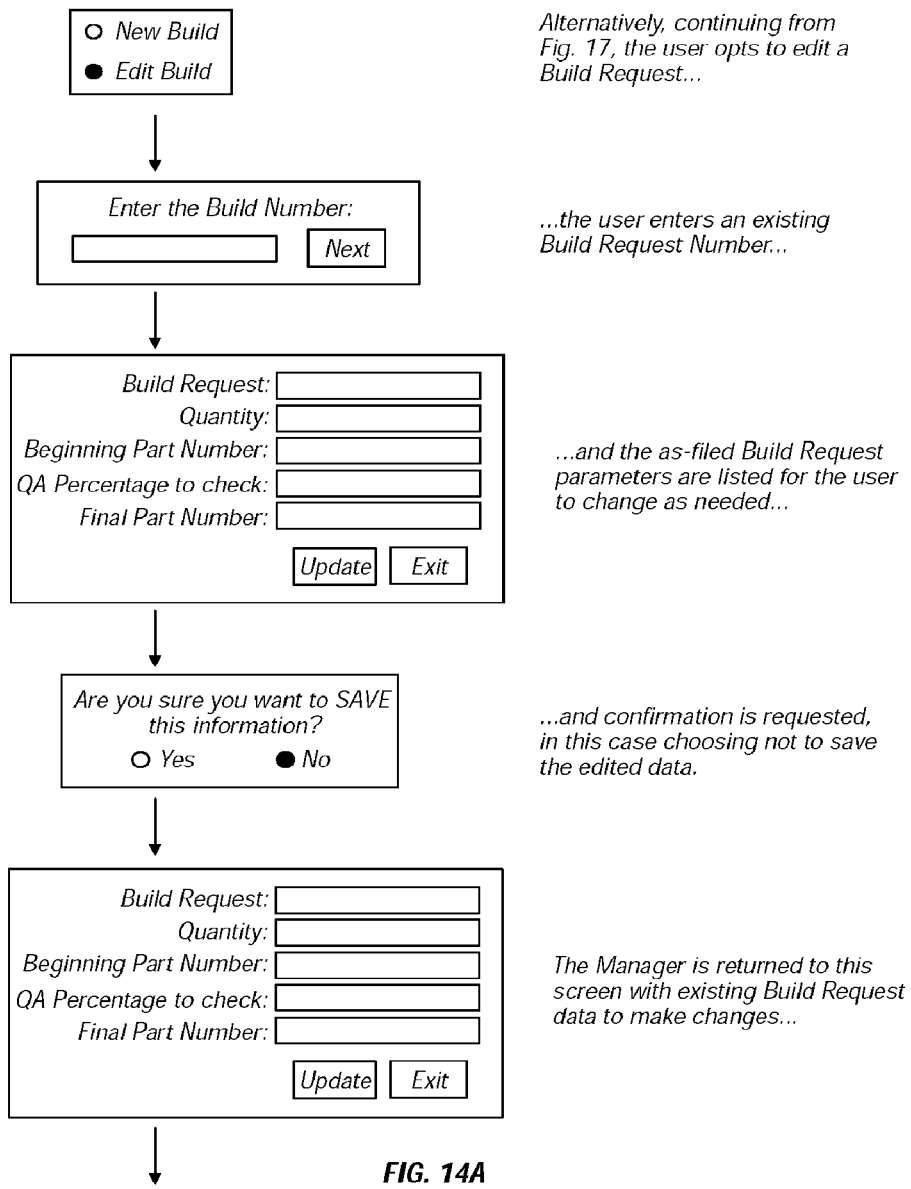
FIGS. 14A and 14B together show a series of menu screens used as part of the Manager Setup process to edit an existing Build Request in the application software of FIG. 6 according to one embodiment of the present invention.
Figure 14B:
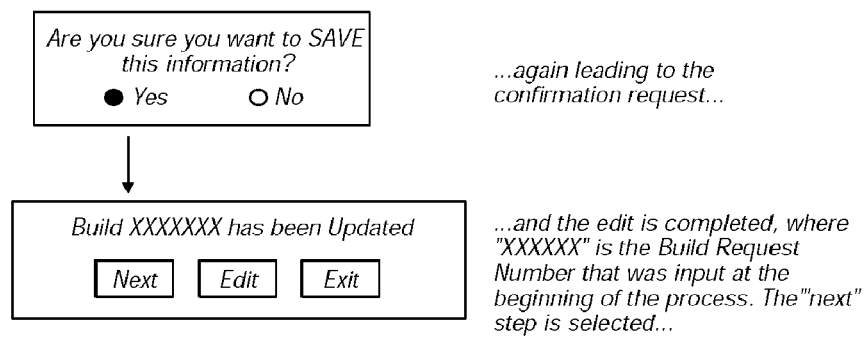

This example illustrates the flow logic for performing Manager Setup Phase tasks. The user enters the application software as described regarding FIG. 6 but selects "Manager". The application software will bring up a sequence of user screens depicted in FIGS. 13A&B, which show the flow of the process of setting up a new Build Request. FIGS. 14A&B show an alternative screen sequence that enables a user to edit the Application Data Tables for an existing Build Request.

TABLE 1

Administrator Setup Table User Setup Table

| NAME | PASSWORD | DATE | LEVEL |
|---|---|---|---|
| admin1 | pw1 | 3 Nov. 2004 | Administrator |
| mgr1 | pw2 | 3 Nov. 2004 | Manager |
| user1 | pw3 | 3 Nov. 2004 | User |

TABLE 2

Administrator Setup Tables
Item Number Setup Table

| NAM SCM | BROWSER IP | GRAPHIC | MIN | MDN | VCODER | BANNER | BREW |
|---|---|---|---|---|---|---|---|
| 246 | 192.268.0.1 | ISP1 | Default | Default | 2 | Brand1 | Ready |
| 246 | 150.255.4 | ISP2 | Default | Default | 2 | Brand2 | Ready |
| 246 | 0.0.0.0 | MFR1 | Default | Default | 2 | Brand3 | Not Ready |

TABLE 3

Application Data Tables
Manager Build Request Setup

| BUILD REQUEST NO. | MANAGER | DATE | 1 PART NUM | FINAL | TECH | SW VER | PRL VER |
|---|---|---|---|---|---|---|---|
| 800123 | mgr1 | 3 Nov. 2003 | 135212 | 135546 | CDMA | 2200.01.35 | 96 |
| 800321 | mgr1 | 3 Nov. 2003 | 135212 | 135214 | CDMA | 2200.01.35 | 50097 |
| 800546 | mgr1 | 3 Nov. 2003 | 135212 | 135557 | CDMA | 2200.01.35 | 400 |

| BUILD REQUEST NO. | QA_% | CUSTOMER | MFG | MODEL | GRAPHIC | CUSTOMER | QUANTITY |
|---|---|---|---|---|---|---|---|
| 800123 | 25 | ISP1 | MFR1 | MDL1 | GRAPHIC1 | ISP1 | 2500 |
| 800321 | 20 | ISP2 | MFR1 | MDL1 | GRAPHIC2 | ISP2 | 3500 |
| 800546 | 100 | ISP3 | MFR1 | MDL1 | GRAPHIC3 | ISP3 | 750 |

TABLE 4

Application Data Tables Application
Collected Table - Operator Phase

| USER | TABLE | DATE PRG | BUILD PRG | TOTAL PRG | QA FAIL |
|---|---|---|---|---|---|
| user1 | A4 | 7 Nov. 2004 | 800123 | 1250 | 0 |
| user1 | C3 | 7 Nov. 2004 | 800321 | 523 | 0 |
| user1 | E7 | 7 Nov. 2004 | 800546 | 66 | 2 |

TABLE 5

Application Data Tables
Application Collected Table - QA Phase

| BUILD | ESN | PRL | SW | ESN_BOX | ESN_PHONE | BOX_LABEL | DATE_QA | BUILD REQUEST QA_RESULT |
|---|---|---|---|---|---|---|---|---|
| 800123 | 13012345678 | PASS | PASS | 13012345678 | 13012345678 | 135546 | 7 Nov. 2003 | PASS |
| 800321 | 15965412365 | PASS | PASS | 15965412365 | 15965412365 | 135214 | 7 Nov. 2003 | PASS |
| 800546 | 25401258746 | FAIL | PASS | 25401258746 | 25401258746 | 135557 | 7 Nov. 2003 | PASS |

Example 4

Figure 15A:
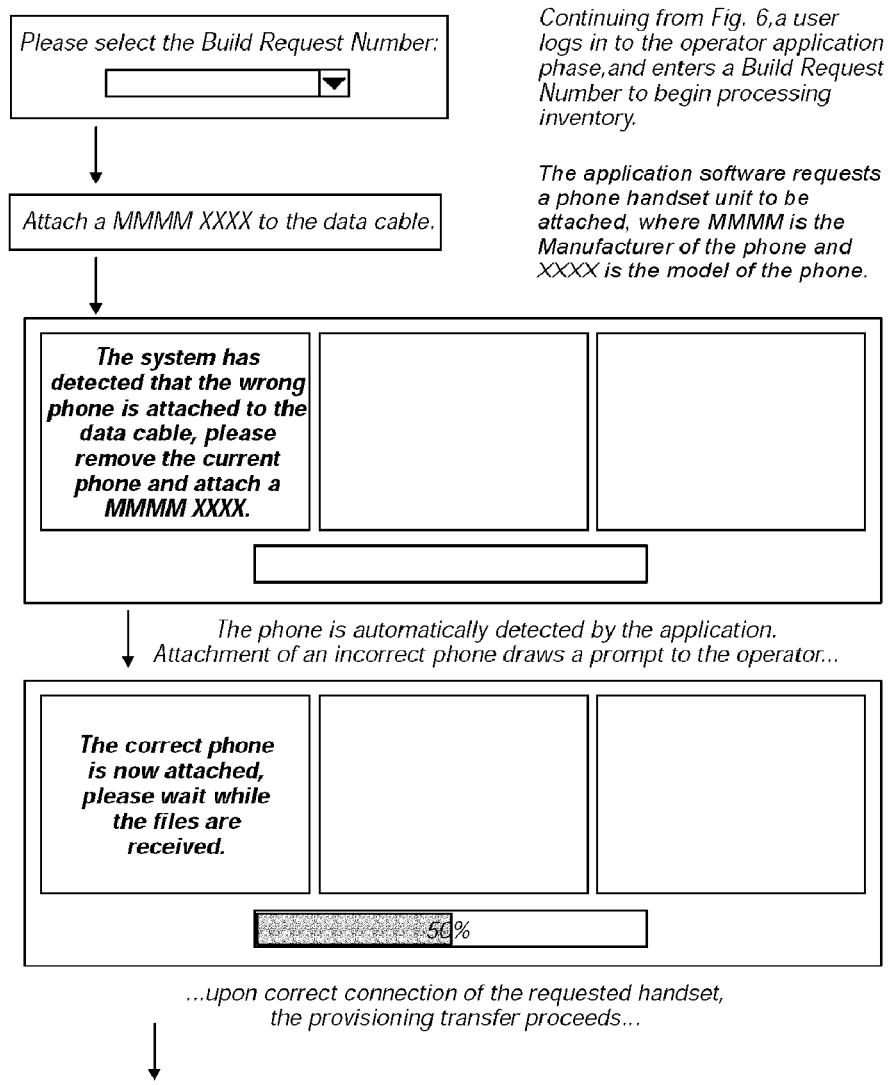
FIGS. 15A, 15B, and 15C together show a series of menu screens used as part of the Provisioning aspect of the Operator Application process to provision the radiotelephone handsets using existing information already loaded into the application software of FIG. 6 according to one embodiment of the present invention.
Figure 15B:
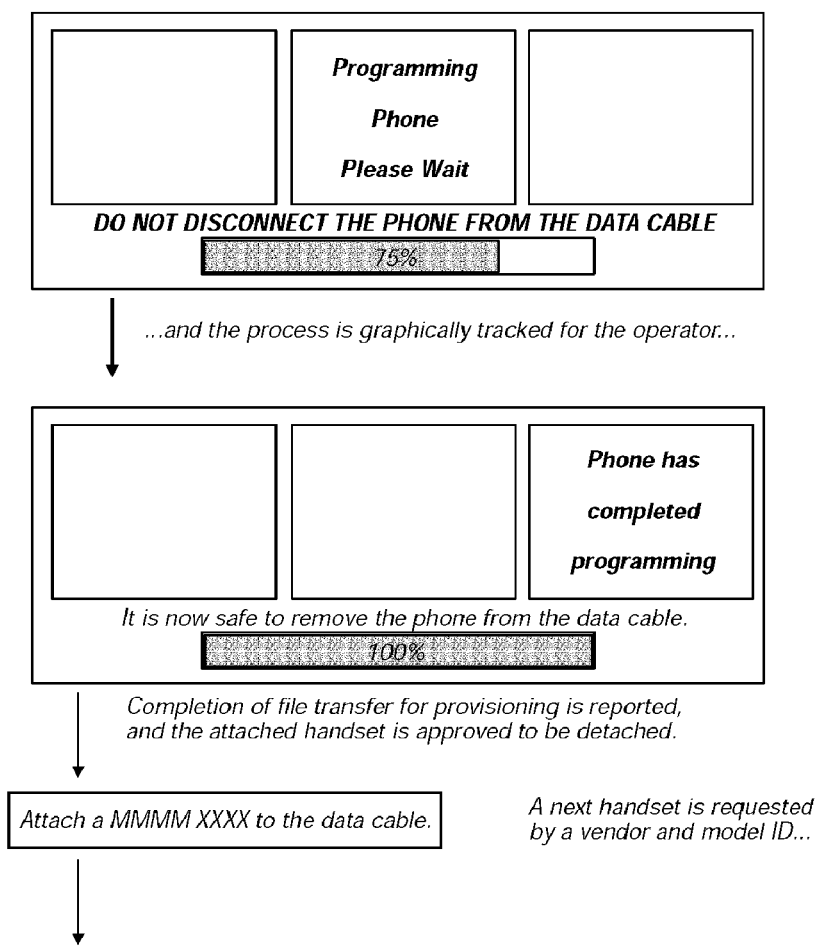
Figure 15C:
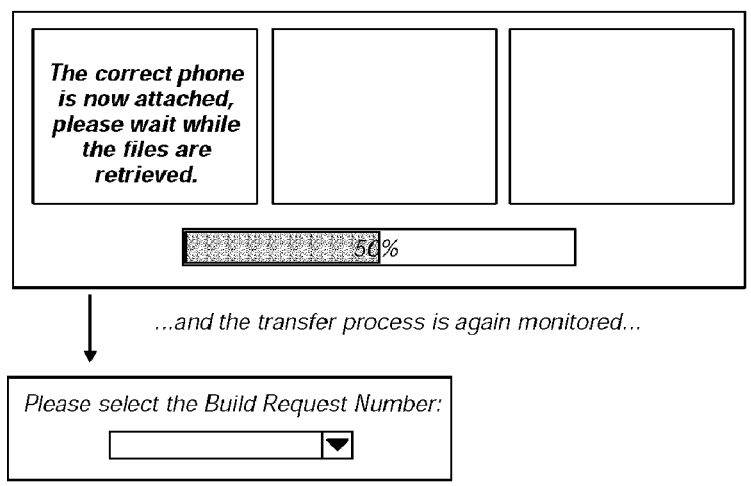
Figure 16A:
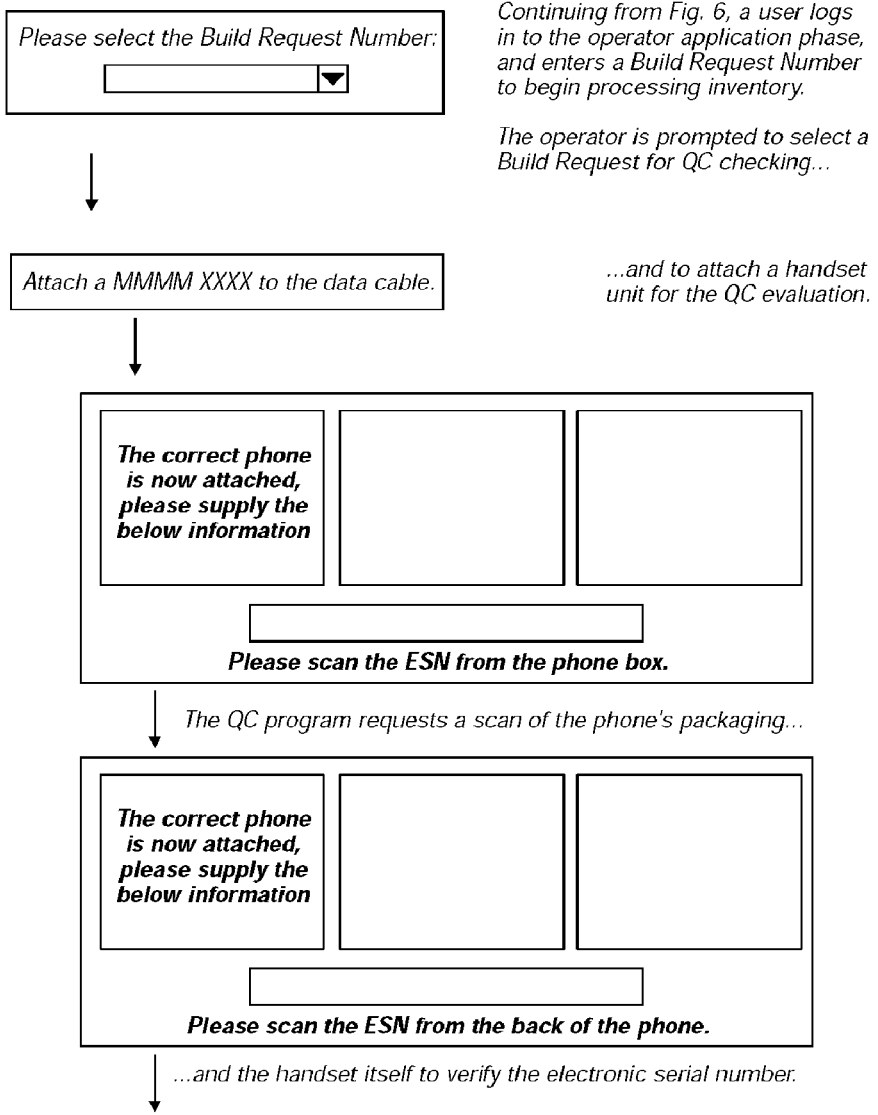
Figure 16C:
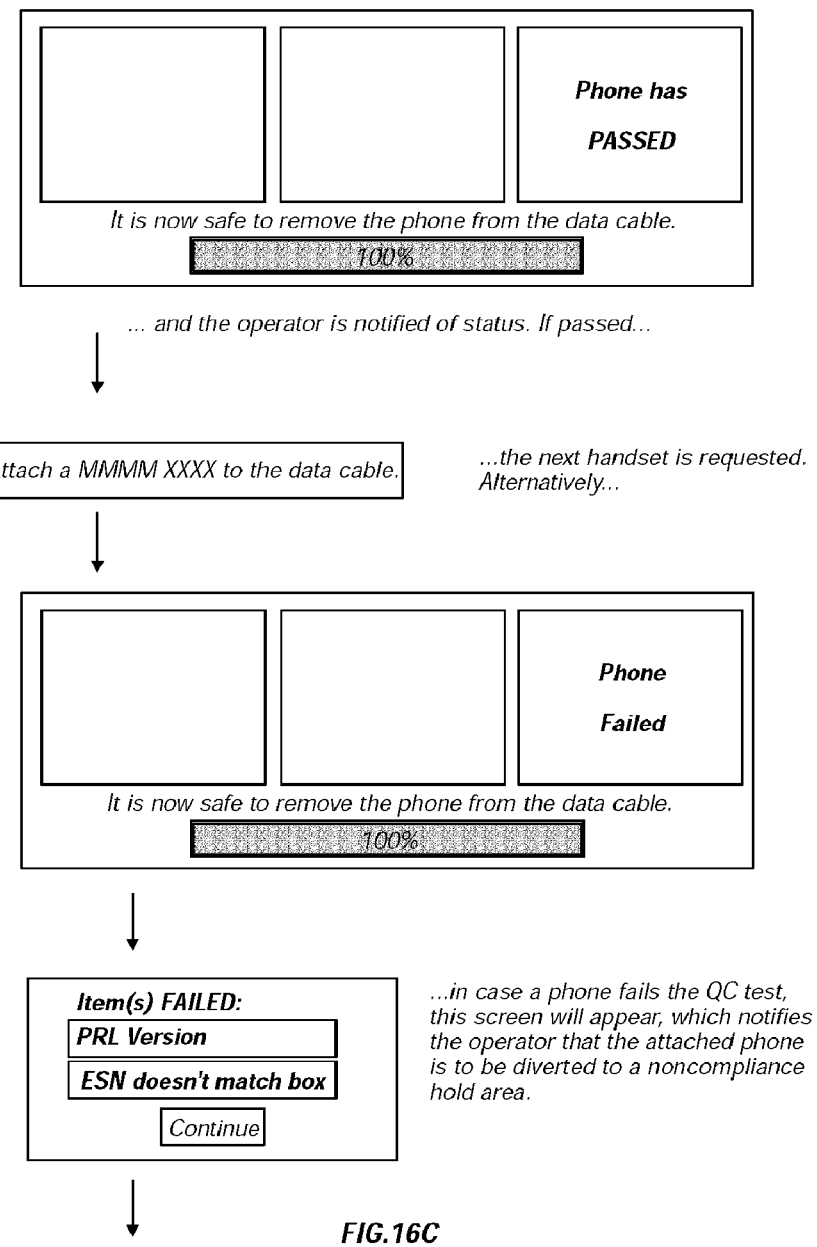
Figure 16D:
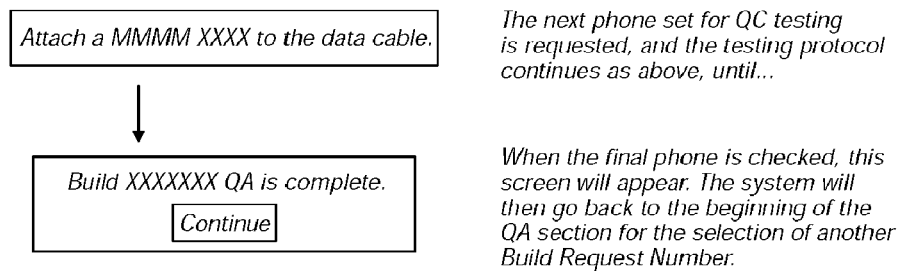

This example illustrates the flow logic for performing Operator Application Phase tasks. The user enters the application software as described regarding FIG. 6 but now selects "Operator". The application software will bring up a sequence of user screens shown in FIGS. 15A-C, which show the flow of the process of selecting a Build Request and proceeding to provision phone units to fulfill the respective customer's order.

Example 5

This example illustrates the flow logic for performing Quality Assurance Phase tasks. Quality Assurance is also a function performed by an operator. The user enters the application software as described regarding FIG. 6 but now selects "QA". The application software will bring up a sequence of user screens shown in FIGS. 16A-D, which show the flow of the process of selecting a Build Request and proceeding to apply the QA checking procedures to phone units provisioned for the respective customer's order.

The invention is described above with reference to non-limiting examples provided for illustrative purposes only. In view thereof, various modifications and changes will become apparent to one of ordinary skill in the art. The invention does not require that the application software of the inventive system perform in exactly the same way to still be within the spirit and scope of the invention. It is intended that all such changes and modifications are within the scope and spirit of the appended claims.

The invention claimed is:

1. A production provisioning system for radiotelephone handset units of varying model, manufacturer, and platform comprising:
   an interface having at least one connector adapted for connection to radiotelephone handsets;
   a computer operably connected to the interface;
   memory storage in communication with the computer containing production provisioning data and instruction data for a specified radiotelephone handset connected via the interface;
   software for verifying connection of the specified handset and automatically transferring the production provisioning data to handset memory storage via the interface in accordance with the instruction data; and
   a first workstation configured to inspect a plurality of provisioned handsets and inspection software for an inspection method comprising the steps of:
      connecting to the first workstation a provisioned handset selected from the plurality of provisioned handsets;
      comparing provisioning information in the memory storage of the provisioned handset to the provisioning data;
      determining whether the inspected handset passes or fails based on the instruction data; and
      moving the handset based upon the determination of pass or failure.

2. The production provisioning system of claim 1 wherein the first workstation has access to a database comprising ANSI Quality tables for inspection under ANSI Z 1.4 to determine whether the inspected handset passes or fails.

3. The production provisioning system of claim 1, wherein the connector is chosen from the group consisting of male USB Type A connector, male USB Type B connector, male Mini USB connector, male Mini USB 2.0 connector, male 4-pin IEEE-1394 connector, male 6-pin IEEE-1394 connector, female USB Type A connector, female USB Type B connector, female Mini USB connector, female Mini USB 2.0 connector, female 4-pin IEEE-1394 connector, female 6-pin IEEE-1394 connector and combinations thereof.

4. The production provisioning system of claim 1, wherein the interface is operably connected to the computer by one or more operable connections chosen from the group consisting of metallic wire, radiofrequency communication, infrared communication, fiber optic cable and combinations thereof.

5. The production provisioning system of claim 1, wherein the provisioning data comprise number assignment module settings, roaming instructions, or a combination thereof.

6. The production provisioning system of claim 1, wherein the provisioning data comprise number assignment module settings, roaming instructions, browser settings, message settings, or combinations thereof.

7. The production provisioning system of claim 6, wherein the provisioning data further comprise user features, short messaging service settings, phone book entries, date book entries, carrier specific settings, user specific settings, or combinations thereof.

8. The production provisioning system of claim 1, wherein the instruction data comprise quantity of phones to provision, carrier type, customer identification data, starting part number, final part number, handset manufacturer, handset technology type, handset model number, or a combination thereof.

9. A production provisioning system for radiotelephone handset units of varying model, manufacturer, and platform comprising:
   a first workstation configured to inspect a plurality of provisioned handsets and inspection software for an inspection method comprising the steps of:
      connecting to the first workstation a provisioned handset selected from the plurality of provisioned handsets;
      comparing provisioning information in the memory storage of the provisioned handset to provisioning data;
      determining whether the inspected handset passes or fails based on the instruction data; and
      moving the provisioned handset based upon the determination of pass or failure.

10. The production provisioning system of claim 9, wherein the first workstation has access to a database comprising ANSI Quality tables for inspection under ANSI Z 1.4 to determine whether the inspected handset passes or fails.

11. The production provisioning system of claim 9, wherein the provisioning data comprise number assignment module settings, roaming instructions, or a combination thereof.

12. The production provisioning system of claim 9, wherein the provisioning data comprise number assignment module settings, roaming instructions, browser settings, message settings, or combinations thereof.

13. The production provisioning system of claim 12, wherein the provisioning data further comprise user features, short messaging service settings, phone book entries, date book entries, carrier specific settings, user specific settings, or combinations thereof.

14. The production provisioning system of claim 9, wherein the instruction data comprise quantity of phones to provision, carrier type, customer identification data, starting part number, final part number, handset manufacturer, handset technology type, handset model number, or a combination thereof.

15. A production provisioning system for radiotelephone handset units of varying model, manufacturer, and platform, comprising:
   an interface having at least one connector adapted for connection to radiotelephone handsets having different specifications;
   a computer operably connected to the interface;
   memory storage in communication with the computer containing production provisioning data and instruction data for a specified radiotelephone handset connected via the interface; and
   software for verifying connection of the specified handset and automatically transferring the production provisioning data to handset memory storage via the interface, wherein the software further comprises instructions for:
      inspecting the memory storage of the automatically provisioned handset to verify provisioning data integrity;

comparing the provisioning information in the memory storage of the connected handset to the provisioning data;

determining whether the provisioned handset passes or fails based on the instruction data associated; and moving the provisioned handset based upon the determination of pass or failure.

16. The universal provisioning system of claim 15 wherein the system has access to a database comprising ANSI Quality tables for inspection under ANSI Z 1.4 to determine whether the inspected handset passes or fails.

17. The production provisioning system of claim 15, wherein the provisioning data comprise number assignment module settings, roaming instructions, or a combination thereof.

18. The production provisioning system of claim 15, wherein the provisioning data comprise number assignment module settings, roaming instructions, browser settings, message settings, or combinations thereof.

19. The production provisioning system of claim 18, wherein the provisioning data further comprise user features, short messaging service settings, phone book entries, date book entries, carrier specific settings, user specific settings, or combinations thereof.

20. The production provisioning system of claim 15, wherein the instruction data comprise quantity of phones to provision, carrier type, customer identification data, starting part number, final part number, handset manufacturer, handset technology type, handset model number, or a combination thereof.

* * * * *